US009936016B2

(12) United States Patent
Krueger et al.

(10) Patent No.: US 9,936,016 B2
(45) Date of Patent: Apr. 3, 2018

(54) SYNCHRONIZED COLLABORATIVE USER INTERFACE

(71) Applicant: Afinos, Inc., New York, NY (US)

(72) Inventors: Richard Krueger, Cary, NC (US); Richard Yi, Phnom Penh (KH)

(73) Assignee: Afinos, Inc., New York, NY (US)

( * ) Notice: Subject to any disclaimer, the term of this patent is extended or adjusted under 35 U.S.C. 154(b) by 15 days.

(21) Appl. No.: 14/568,732

(22) Filed: Dec. 12, 2014

(65) Prior Publication Data

US 2015/0172381 A1 Jun. 18, 2015

Related U.S. Application Data

(60) Provisional application No. 61/916,245, filed on Dec. 15, 2013.

(51) Int. Cl.
*G06F 17/00* (2006.01)
*H04L 29/08* (2006.01)
*G06F 11/16* (2006.01)

(52) U.S. Cl.
CPC ...... *H04L 67/1095* (2013.01); *G06F 11/1662* (2013.01); *H04L 67/02* (2013.01)

(58) Field of Classification Search
CPC .................................................. G06F 11/1662
USPC ............... 707/E17.005, 610; 3/E17.005, 610
See application file for complete search history.

(56) References Cited

U.S. PATENT DOCUMENTS

| | | | |
|---|---|---|---|
| 6,785,869 B1 * | 8/2004 | Berstis | G06F 17/241 707/E17.005 |
| 8,010,487 B2 * | 8/2011 | Richardson | G06F 17/30165 707/622 |
| 8,214,747 B1 * | 7/2012 | Yankovich | G06F 9/4451 715/751 |
| 2001/0052108 A1 * | 12/2001 | Bowman-Amuah | G06Q 10/06 717/100 |
| 2004/0003371 A1 * | 1/2004 | Coulthard | G06F 8/24 717/101 |
| 2006/0129627 A1 * | 6/2006 | Phillips | H04L 63/10 709/200 |
| 2008/0140732 A1 * | 6/2008 | Wilson | G06F 17/3023 |
| 2011/0276636 A1 * | 11/2011 | Cheng | H04L 69/14 709/206 |

(Continued)

*Primary Examiner* — Mohammed H Zuberi
(74) *Attorney, Agent, or Firm* — Coats & Bennett, PLLC

(57) ABSTRACT

A cloud based collaborative work environment enables users to work collaboratively within a shared workspace. An application server on a host device is accessible to client devices via a communication network and maintains the shared workspace for collaboration between users. Client applications hosted on client devices enable users of the workspace to access and make changes in the shared workspace, such as adding or deleting items to or from the workspace, editing or annotating existing items, viewing items in the workspace, or downloading items in the workspace. Local copies of the shared workspace are maintained by the client devices and are synchronized with the shared workspace maintained by the application server so that any changes made to by a user to its local copy of the shared workspace are propagated to other users. Thus, synchronization is maintained between master workspace and the local workspaces on the client devices.

14 Claims, 10 Drawing Sheets

(56) References Cited

U.S. PATENT DOCUMENTS

| | | | |
|---|---|---|---|
| 2012/0330887 A1* | 12/2012 | Young | G06F 17/30017 707/610 |
| 2014/0040186 A1* | 2/2014 | Okamura | G06F 17/2735 707/609 |
| 2014/0195492 A1* | 7/2014 | Wilding | G06F 17/30371 707/684 |

* cited by examiner

SYNCHRONIZED COLLABORATIVE USER INTERFACE

RELATED APPLICATIONS

The present disclosure claims priority from U.S. Provisional Application Ser. No. 61/916,245 filed Dec. 15, 2013, the entirety of which is incorporated herein by reference.

TECHNICAL FIELD

The present disclosure relates generally to a web-based collaboration environment providing a collaborative workspace shared by multiple users and, more particularly, to synchronizing the shared workspace maintained by a server with local copies of the shared workspace on client computing devices.

BACKGROUND

There are many situations where different users need to collaborate and work together in a coordinated fashion. As an example, users at different locations may need to collaborate to generate a report or presentation. The generation of the report or presentation may involve use of many different software applications. For example, a text editor may be used to generate text for the report while a graphics program is used to generate graphics and a photo editing program is used to generate or manipulate images. Collaboration software helps to facilitate collaboration by users at different locations by providing a shared workspace on a server in which the users collaborate. The workspace contains work items on which the users collaborate, such as text files, spreadsheets and images. Users of the collaborative workspace may add, delete or edit work items. A client application at each user device communicates with the collaboration software at the server and provides each user with a view of the same workspace.

One problem frequently encountered in collaborative systems is maintaining synchronization between client devices and the shared workspace at the server. Lack of synchronization may cause conflicts between users. For example, if synchronization is not maintained, a user may attempt to edit a document that has been deleted by another user. Therefore, it is necessary to maintain synchronization in real time or near real time between client devices and the shared workspace.

SUMMARY

Embodiments of the present disclosure provide a cloud-based collaborative work environment enabling users to work collaboratively within a "master workspace," referred to herein as a "shared workspace." An application server runs on a host device and is accessible to client devices via a communication network, such as the Internet. The application server maintains a shared workspace for collaboration between users. Client applications hosted on client devices enable users of the workspace, referred to herein as collaborators, to access and make changes to assets or "items" in the shared workspace. For example, collaborators may add new items to the workspace, edit or annotate items in the workspace, view items in the workspace, download items in the workspace, or delete items from the workspace. Each instance of the client application on a client device maintains a local copy of the shared workspace, which is termed a "room." The local copies of the shared workspace maintained by the client devices are synchronized with the shared workspace maintained by the application server and any changes made by a user to a "room" on a client device are propagated to other users. Thus, synchronization is maintained between all "rooms" on client devices and the shared workspace maintained by the application server.

Of course, those skilled in the art will appreciate that the present disclosure is not limited to the above contexts or examples, and will recognize additional features and advantages upon reading the following detailed description and upon viewing the accompanying drawings.

BRIEF DESCRIPTION OF THE DRAWINGS

Exemplary embodiments of the present disclosure will become more fully apparent from the following description and appended claims, taken in conjunction with the accompanying drawings. It should be understood that the drawings illustrate only exemplary embodiments, and therefore, do not limit the scope of the disclosure. The exemplary embodiments of the invention will be described with additional specificity and detail through use of the accompanying drawings in which:

DETAILED DESCRIPTION

Embodiments of the present disclosure provide a cloud-based collaborative system enabling users to work collaboratively within a shared workspace. A workspace is similar to a desktop rendered on a display screen of a computing device, and provides a user interface that a user can interact with.

An application server runs on a host device and is accessible to client devices via a communication network, such as the Internet. The application server maintains a shared workspace for collaboration between users. Client applications hosted on client devices enable users of the workspace, referred to herein as collaborators, to access and make changes in the shared workspace, such as adding new items to the workspace, editing or annotating items in the workspace, viewing items in the workspace, downloading items in the workspace, or deleting items from the workspace. Each instance of the client application on a client device maintains a local copy of the shared workspace, which is termed a "room." The local copies of the shared workspace maintained by the client devices are synchronized with the shared workspace maintained by the application server. Any changes made by a user to a "room" on a client device are propagated to other users. Thus, synchronization is maintained between all "rooms" maintained on client devices and the shared workspace maintained by the application server.

Figure 1:
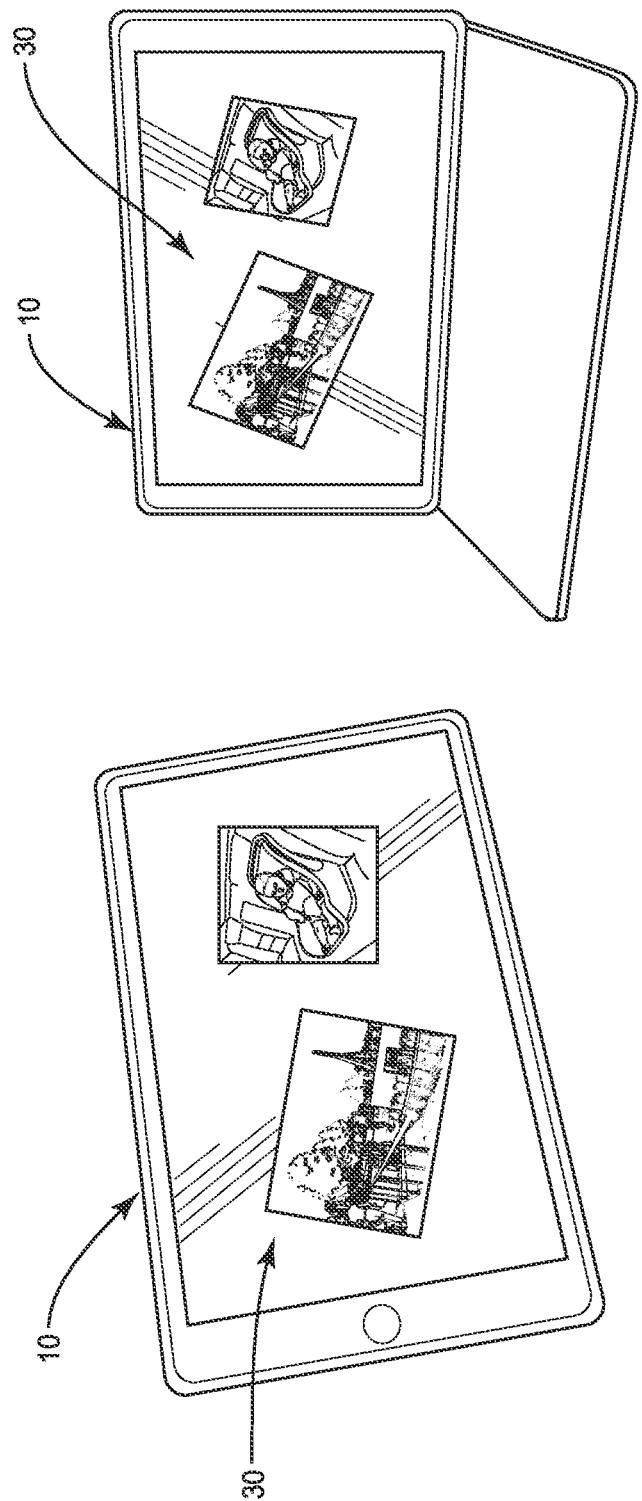
FIG. 1 is a perspective view illustrating the User Interfaces (UIs) of exemplary computing devices configured according to one embodiment of the present disclosure.

FIG. 1 illustrates two client devices 10 accessing a shared workspace. The client devices 10 in this embodiment are tablet computing devices; however, those of ordinary skill in the art will appreciate that the disclosure is not so limited. In other embodiments of the present disclosure, the client devices 10 comprise any combination of one or more tablet devices, cellular telephones, laptop and/or notebook computing devices, personal desktop computers, and the like. The client devices 10 may be geographically separated by a vast distance.

Each client device 10 runs a client application that provides the user with access to the shared workspace maintained by a cloud-based application, which in this example comprises two images 30. The client application on the client device 10 maintains a local copy of the shared workspace referred to as a room. The users of the client devices 10 may add, edit, or delete items in the room on their client device 10. The client device 10 synchronizes its local room with the shared workspace and changes made in a local room on any local client device 10 are propagated to other client devices 10. Assuming that synchronization is maintained, all users should have the same view of the workspace.

Figure 2:
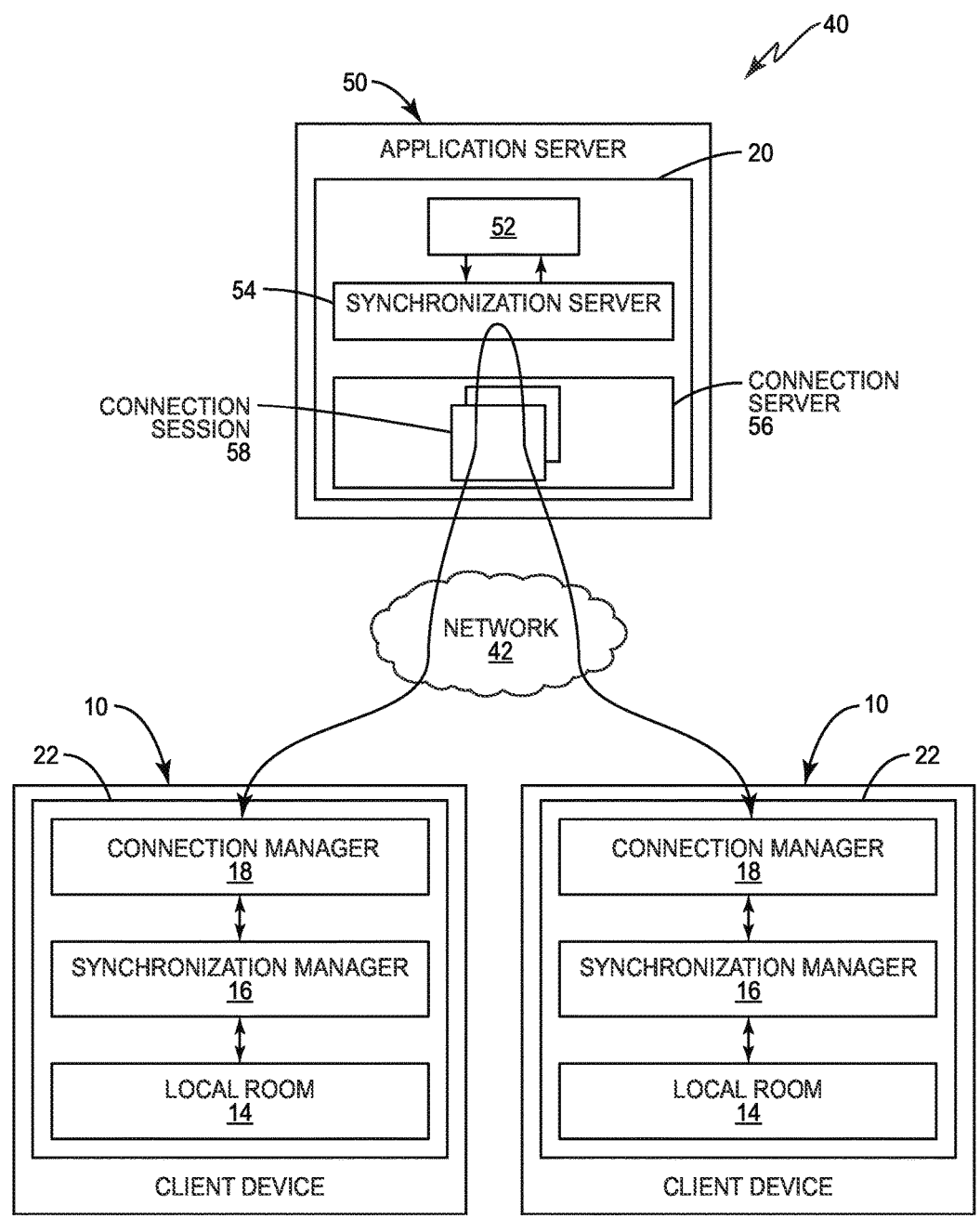
FIG. 2 is a block diagram illustrating a communications network configured to synchronize a plurality of UIs across a computing network according to one embodiment of the present disclosure.

FIG. 2 is a block diagram illustrating a collaboration system 40 according to one embodiment of the present disclosure. As seen in FIG. 2, collaboration system 40 comprises an application server (AS) 50 and two or more client devices 10 connected by an IP network 42.

The IP network 42 may comprise one or more private and/or public networks, such as the Internet, for example, but is generally configured to transport data between the client devices 10 and the AS 50 in data packets. The data packets, which carry information and data related to the assets that are shared between client devices 10, for example, may be communicated over IP network 42 according to any known protocol. However, in one embodiment, the data packets are transported between the client devices 10 and the AS 50 using the Transport Control Part/Internet Protocol (TCP/IP), as is well known in the art.

Application server 50 hosts a cloud-based application 20 providing a collaborative work environment. The cloud-based application 20 comprises two main components: a synchronization server 54 and a connection server 56. The synchronization server 54 is responsible for maintaining one or more shared workspaces 52 that are accessible to authorized users of each shared workspace 52. The synchronization server 54 also includes functionality for maintaining synchronization between the shared workspaces 52 maintained by the application server 50, referred to as the "master copy," and local copies of the shared workspace 52, referred to herein as rooms 14, maintained by client devices 10.

The shared workspace 52 maintained by the synchronization server 54 may be represented by a dictionary that describes the current state of the workspace. The dictionary may, for example, comprise a collection of name-value pairs that describe assets within the workspace 52 at a given point in time. Changes in the workspace 52 are reflected by corresponding changes in the name-value pairs. The synchronization server 54 maintains a state count that indicates the current state of the shared workspace 52. In one embodiment, the state count is encoded as a 64-bit integer that starts at zero and is incremented towards infinity each time the shared workspace is updated. As described in more detail below, the state count is used to facilitate synchronization between the shared workspace 52 maintained by the application server 50 and the local copies of the shared workspace 52 maintained by the client devices 10.

The dictionary may be implemented, for example, as a Javascript Object Notation (JSON) object. As known in the art, the JSON object may have a flat data structure or hierarchical data structure. In the latter case, the root object contains a collection of name-value pairs. The value in a name-value pair of the root object may comprise another object, which also contains a collection of name vale-pairs, which may comprise still other objects.

The connection server 56 is in communication with the client devices 10 and is responsible for identifying client devices 10, maintaining connections with client devices 10, and transferring data to and from the client devices 10. Each client device 10 is associated with a user. In one exemplary embodiment, there is a one-to-one mapping between users and client devices 10. Every user that is managed by the connection server 56 is unique across the network and is denoted with a unique name. By way of example only, one embodiment of the present disclosure identifies each different user with a different alphanumeric name. Each user also has a list of peers (e.g., 'contacts') with whom the workspace is shared. The connection server 56 maintains a connection session 58 for each connected client device 10. The connection session 58 comprises information regarding the state of the connection between the application server 50 and client devices 10. The session information may, for example, indicate whether a client device 10 is connected, disconnected, active, inactive, etc.

Each client device 10 runs a client application 22 that communicates with the application 20 on the AS 50 comprising a synchronization manager 16 and connection manager 18. The synchronization manager 16 maintains a local copy of the shared workspace 52, which is a unit of share referred to as a room 14. The synchronization manager 16 at each client device 10 communicates with the synchronization server 54 using a synchronization protocol as hereinafter described to maintain the local room 14 synchronized with the shared workspace 52 maintained by the synchronization server 54. The local room 14 maintained by the client device 10 may, as previously described, be represented by a local dictionary 70 that reflects the current state of the local room 14 on the client device 10. To maintain the local room 14 synchronized with the shared workspace 52, the synchronization manager 16 at each client device 10 synchronizes the local dictionary 70 with the master dictionary 100 maintained by the synchronization server 54. As described in more detail below, changes in the local room 14 are transferred to the synchronization server 54 and propagated to other client devices 10.

The connection manager 18 at each client device 10 provides services to the synchronization manager 16, such as maintaining connections with the application server 50 and transferring data to and from the application server 50. The connection managers 18 at the client devices 10 function as gateways between the client devices 10 and the connection server 56 of AS 50. The connection managers 18 transfer data to and from the AS 50 by making Application Programming Interface (API) calls to the connection server 56 in response. The API may be implemented using any technology now known or later developed. In one embodiment, the connection manager 18 may send data to the AS 50 as a set of HyperText Transfer Protocol (HTTP) GET/POST requests using a REpresentational State Transfer (REST) API. The connection managers 18 may receive messages from the synchronization server 54 via connection session 58 (e.g., by using RESTful API calls to poll the synchronization server 54).

Process communications between the synchronization manager 16 and connection manager 18 is asynchronous. When the user makes a change to the local room 14 at a client device 10, the synchronization manager 16 sends a request message to the connection manager 18. The connection manager 18, in turn, calls an API function to forward the request message to the connection server 56. In the reverse direction, the connection manager 18 receives messages from the connection server 56, for example, for updating local room 14, and then forwards those received messages to the synchronization server 16. The synchronization manager 16 updates the state of the local room 14 to maintain synchronization with the shared workspace 52.

In one embodiment, the connection manager 18 queues message received from the synchronization manager 16 and sends them one at a time to the AS 50. Once a message is sent, the next message is held in the queue until the previous message is confirmed or acknowledged by the AS 50.

In some embodiments, the connection manager 18 at the client device 10 may implement a retransmission protocol to deliver the message from the synchronization manager 16 to the AS 50. If a message sent by the connection manager 18 is not confirmed, the connection manager 18 may resend the message a predetermined number of times. After each transmission, a timer may be set. When the timer expires, the message is retransmitted. When the maximum number of transmissions is reached, the connection manager 18 notifies the synchronization manager 16, which may undo any changes that were not confirmed.

Figure 3:
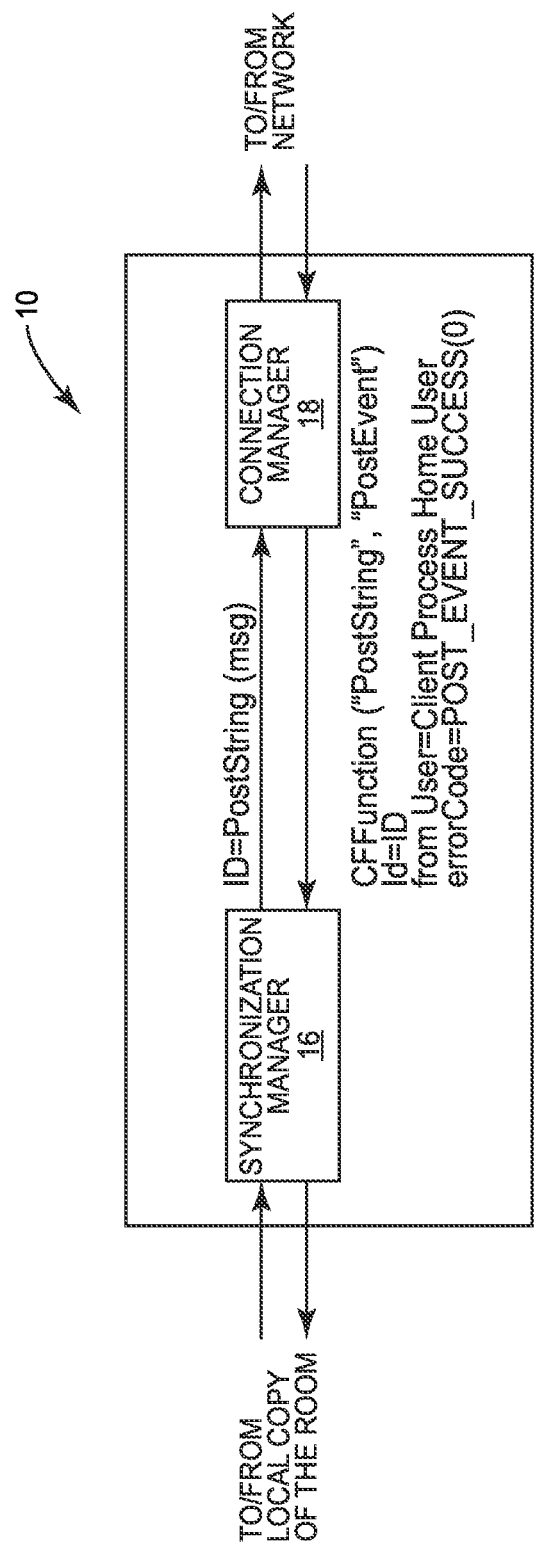
FIG. 3 is a block diagram illustrating an event function notification mechanism at a client device configured according to one embodiment of the present disclosure.

FIG. 3 illustrates the messaging that occurs between the connection manager 18 and the synchronization manager 16 at a client device 10 in one embodiment.

By way of example, upon receiving a request to send an update to the AS 50, the synchronization manager 16 invokes a service function "PostString," and receives a 32-bit identifier (ID) in a notification message that denotes the call to the services.

ID=PostString(msg)

The subsequent response from the connection manager 18—i.e., "CFFunction"—is then received by the synchronization manager 16 through an event function notification mechanism. This is necessary as specific services may be deferred to other threads in some cases, and to other client devices.

As seen in FIG. 3, the "CFFunction" response returned by the connection manager 18 has multiple parameters. One of the parameters is the 32-bit unique identifier ID. This identifier ID can be compared to the identifier ID previously received in the notification message from the connection manager 16, and used to steer the response message to the appropriate calling process to update the local room 14.

Figure 4:
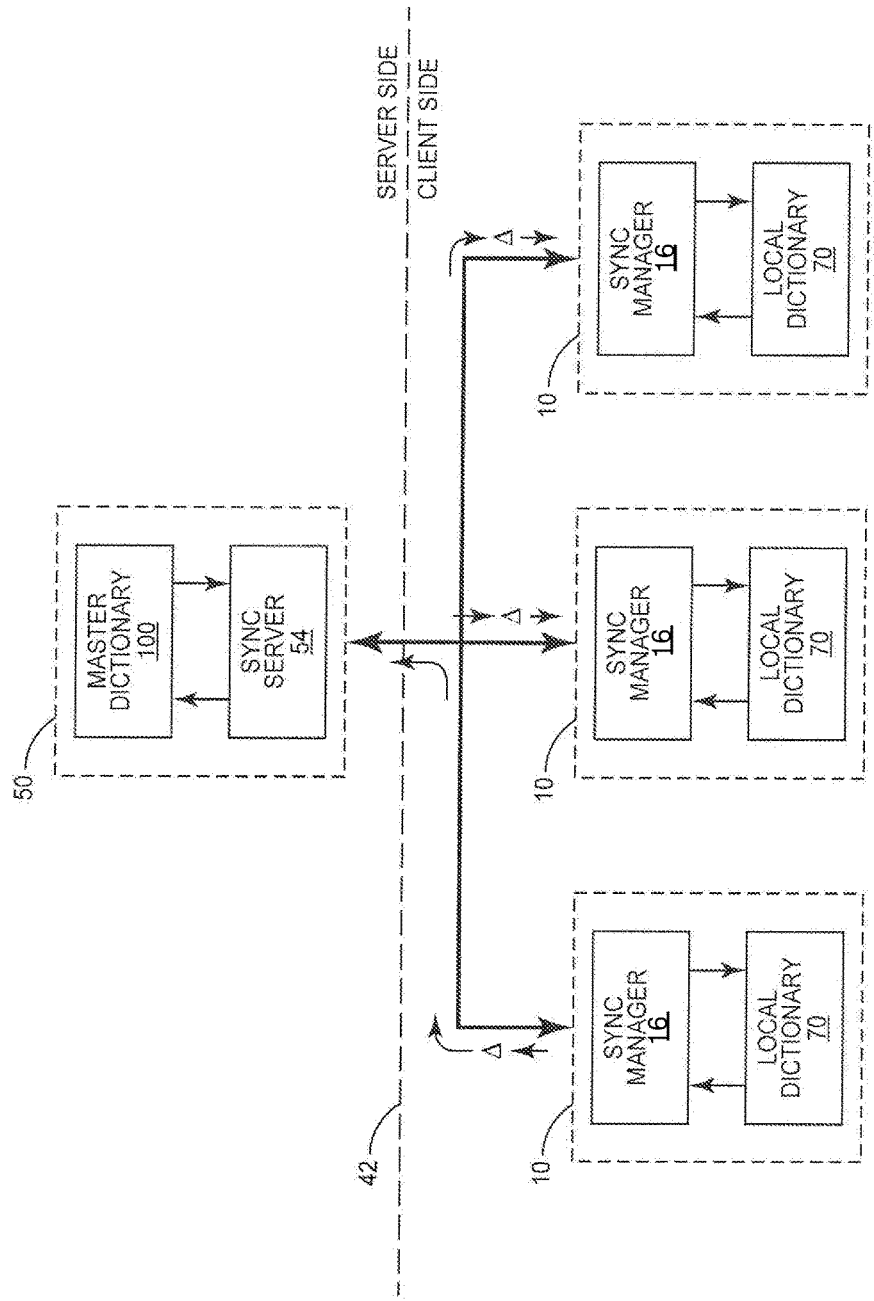
FIG. 4 is a block diagram illustrating multiple client devices synchronizing with a synchronization server according to one embodiment of the present disclosure.

FIG. 4 is a block diagram illustrating the entities involved in the synchronization between the AS 50 and client devices 10 according to one embodiment of the present disclosure. As previously described, the synchronization server 54 at the AS 50 maintains a master dictionary 100 that encodes the current state of the shared workspace 52. The synchronization server 54 also maintains a state count that tracks the current state of the shared workspace 52. The synchronization manager 16 at each client device 10 likewise maintains a local dictionary 70 that encodes the current state of the local room 14 at each client device 10, and a state count that tracks the current state of the local dictionary 70.

The state of the shared workspace 52 and local rooms 14 changes over time as a result of user interactions. Each time the shared workspace 52 or local room 14 is updated, the state count is incremented. Any changes made to a local room 14 on a client device 10 are sent by the client device 10 in an update message to the AS 50 and propagated to other client devices 10 using a synchronization state protocol. The synchronization state protocol is implemented by the synchronization server 54 on the AS 50 and the synchronization managers 16 on client devices 10. The synchronization protocol provides the mechanism for synchronizing the state of the local dictionary 70 at each of the client devices 10 with each other, and with the master dictionary 100 at AS 50 using the (name, value) pairs. The local room 14 is synchronized when the state count of the local room 14 is equal to the state count of the shared workspace 52.

In one exemplary embodiment, changes to the state of the shared workspace 52 or a local room 14 are reflected by applying a series of operations to the name-value pairs in the master dictionary 100 or local dictionary 70. In one exemplary embodiment, there are three types of operations:

add (name value)
    delete (name); and
    set (name, value).

The series of operations applied when moving from state S to state S+1 is referred to as a delta, $\Delta_i$. Thus, a delta $\Delta_i$ comprises an ordered set of operations (op$_1$, op2, . . . opN) that are applied to the name value pairs in the dictionary.

When a change is made in the local room 14 at a client device 10, the synchronization manager 16 at the client device 10 applies a delta $\Delta_i$ representing the operations on the name-value pairs made in its local dictionary 70 and sends the delta $\Delta_i$ to the synchronization server 54 in an update message. After applying delta $\Delta_{i-1}$, the synchronization manager 16 constructs an undo set of operations $U_i$ that can "undo" the delta $\Delta_i$ by applying the undo set to the state $S_i$. The rules for constructing the undo set are outlined below in Table 2:

TABLE 1

| Delta Operation | Undo Operation |
|---|---|
| Add (name, value) | Delete (name) |
| Delete (name) | Add (name, old value) |
| Set (name, value) | Set (name, old value) |

The synchronization server 54 applies the delta $\Delta_i$ to the master dictionary 100 for the shared workspace 52, and forwards the delta $\Delta_i$ to the other client devices 10 in an update message, which apply the delta $\Delta_i$ to their own local dictionaries 70. The synchronization server 54 also sends a confirmation message to the client device 10 from which the delta $\Delta_i$ originated. As described in more detail below, the synchronization manager 16 at the client device 10 may undo any changes made prior to receiving confirmation from the synchronization server 54.

Figure 5:
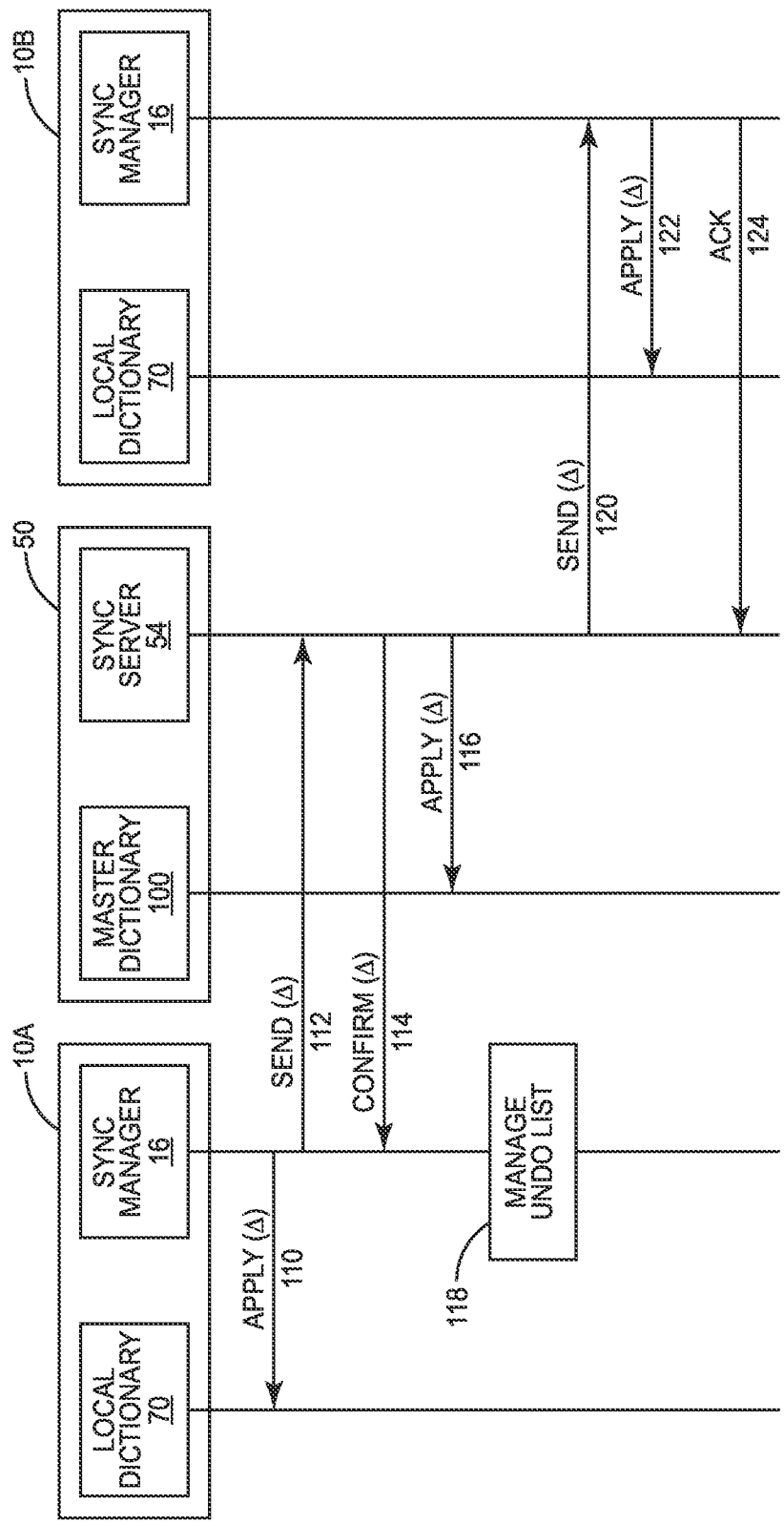
FIG. 5 is a call flow diagram illustrating signaling between a synchronization server and multiple client devices when synchronizing the UIs at each of the client devices according to one embodiment of the present disclosure.

FIG. 5 is a call flow diagram illustrating the signaling for synchronizing the local dictionaries 70 on client devices 10 and the master dictionary 100, in response to a user updating a local room 14. FIG. 5 shows two client devices denoted by reference numbers 10A and 10B respectively. As seen in FIG. 5, the synchronization manager 16 at client device 10A first applies a delta Δ (or update) to its own local dictionary 70 (step 110), and then sends that delta Δ (or update) to the synchronization server 54 at AS 50 (step 112). As previously described, the delta Δ is sent in an update message to the synchronization server 54 via connection manager 16 and connection server 56. Upon receipt of the delta Δ, the synchronization server 54 returns a confirmation message to synchronization message 16 (step 114), and applies the delta Δ to its own master dictionary 100 (step 116) to synchronize the state of the master dictionary 100 to the state of the local dictionary 70. The synchronization manager 16 then manages its undo list (step 118). The synchronization server 54 then sends the delta Δ in a message to the synchronization manager 16 at client device 10B (line 120). Upon receipt, the synchronization manager 16 at client device 10B applies the received delta Δ to its local dictionary 70 (line 122) thereby synchronizing local dictionary 70 at client device 10B to the states of the local dictionary 70 at client device 10A and the master dictionary 100. In some embodiments, the synchronization manager 16 at client device 10B may send an acknowledgement (ACK) message to the to the synchronization server 54 (line 124) to confirm that the change was made. In this way, the server 54 is able to keep track of the current state of the local dictionary 70 on the client device 10B.

As previously stated, synchronization server 54 can have multiple clients devices 10 connected to it. To manage the client devices, the synchronization server 54 maintains the client devices 10 in a list, using, for example, a unique identifier for each client device 10. Client devices 10 can connect to the synchronization server 54, disconnect from the synchronization server 54, and then reconnect the synchronization server 54 at some future time. Each of the client devices 10 and the synchronization server 54 at AS 50 maintain copies of the state (i.e., the dictionaries). The difference is that the synchronization server 54, as stated above, maintains the master dictionary 100 as well as the undo list for undoing deltas.

Figure 6:
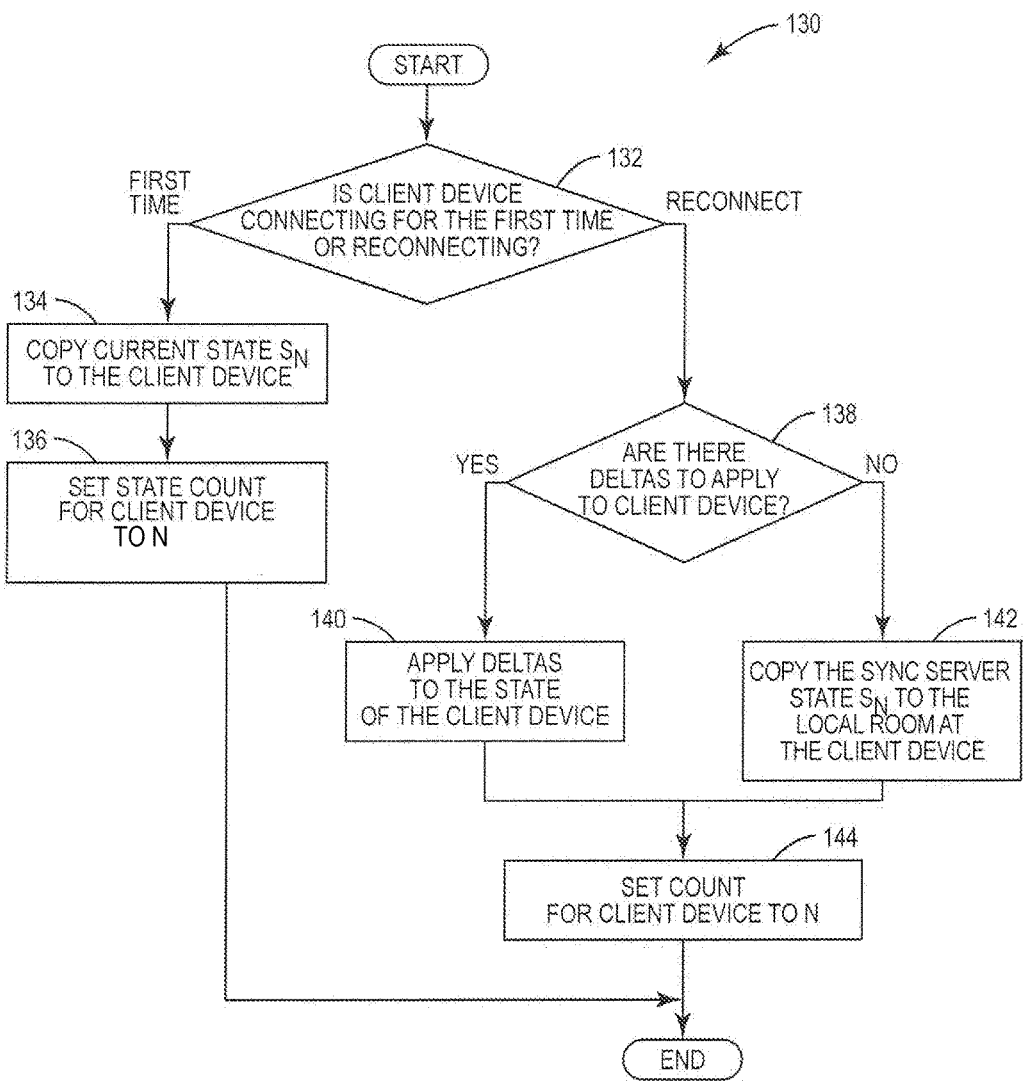
FIG. 6 is a flow diagram illustrating a method for synchronizing a new client device according to one embodiment of the present disclosure.

FIG. 6 is a flow diagram illustrating a method 130 for synchronizing the client devices 10 when the client devices 10 initially connects or reconnects to the AS 50. Method 130 begins with the synchronization server 54 determining whether client device 10 is connecting to the synchronization server 54 initially, or whether client device 10 is reconnecting to the synchronization server 54 after having been disconnected (box 132). If the client device 10 is connecting to the synchronization server 54 for the first time, synchronization server 54 sends a copy of the current state $S_N$ of the shared workspace 52 (i.e., the current state of the master dictionary 100) to the client device 10 (box 134), and sets the state count for the client device 10 to a value that is equal to N—i.e., the current state count at the synchronization server 54 (box 136).

If the synchronization server 54 determines that the client device 10 is reconnecting (box 132), the synchronization server 54 will determine whether there are any deltas to apply to update the local room 14 on the client device 10 (box 138). Such deltas may have been applied by the synchronization server 54 to the shared workspace 52, for example, while the client device 10 was disconnected. The unapplied deltas may be determined by comparing the state count of the local dictionary 70 at the client device 10 to the state count of the master dictionary 100. If there are any unapplied deltas, the synchronization server 54 sends the deltas to the synchronization manager 16 on the client device 10. Otherwise, if there are no deltas to apply, synchronization server 54 will simply send a copy of the current state $S_N$ of the synchronization server 54 to the client device 10 (box 142). Regardless of whether synchronization server 54 does or does not apply any deltas, however, the synchronization server 54 sets the state count for the client device 10 to N to indicate that the local room 14 at client device 10 has been updated to reflect the latest state of the shared workspace 52 (box 144). Thus, synchronization server 54 will ensure that the client device 10 is synchronized with the shared workspace 52.

After connecting to the synchronization server 54, the synchronization manager 16 can synchronize the local dictionary 70 with the master dictionary 100 by exchanging deltas with the synchronization server 54. In general, if a client device 10 generates a delta $\Delta_i$, it first applies the delta $\Delta_i$ to its local dictionary, updates its undo list to include the delta or in verse of the delta, and forwards the delta to the synchronization server 54 at AS 50. The synchronization server 54 applies the delta, forwards it to other client devices 10, and sends a confirmation back to the originating client device 10. If the delta is not confirmed, the synchronization manger 16 may undo the changes. The synchronization manager 16 may also receive deltas from the synchronization server 54. Upon receipt of a delta from the synchronization server 54, the synchronization manager 16 applies the delta to its own local dictionary 70 and increments the state count.

Figure 7:
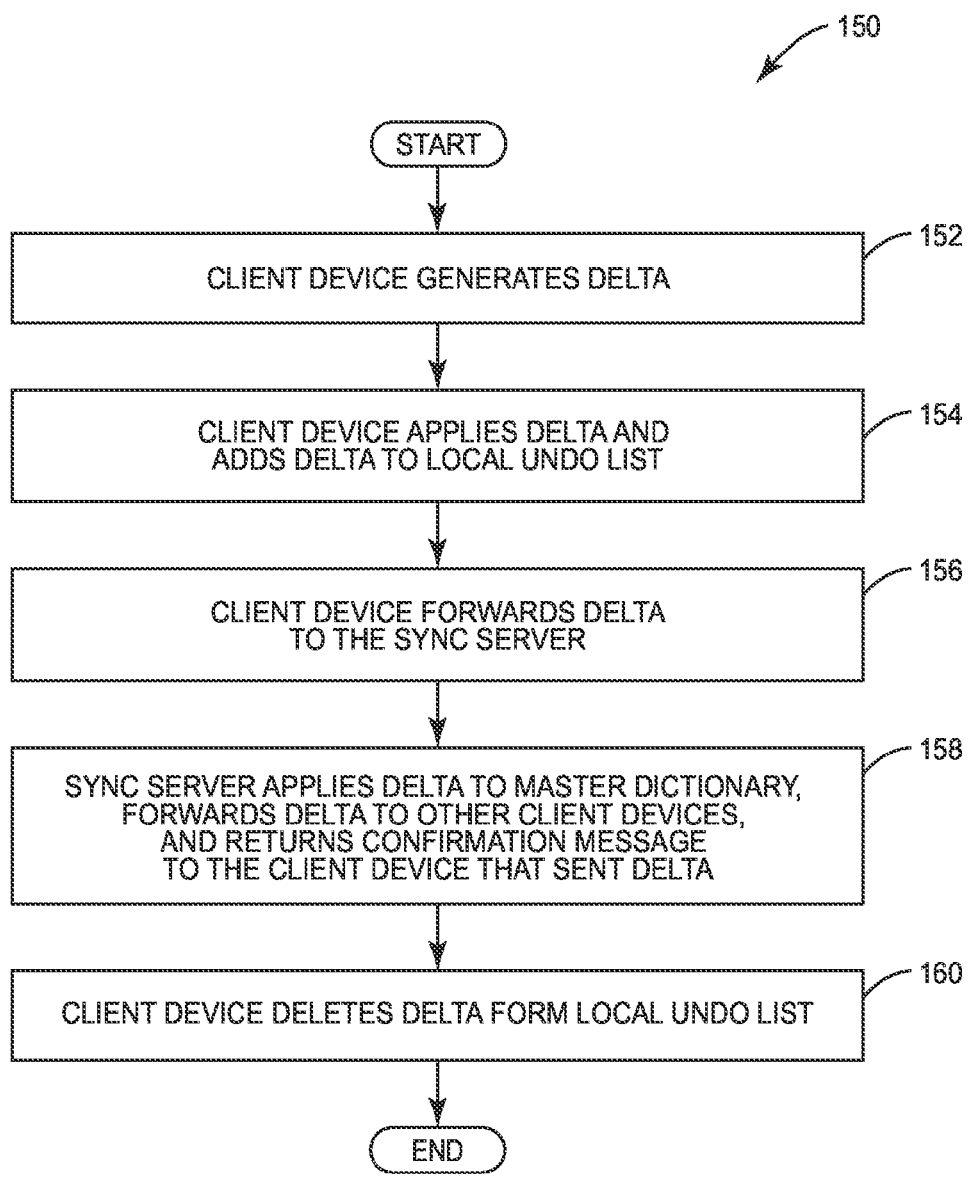
FIG. 7 is a flow diagram illustrating a method for maintaining synchronization of the UIs at the client devices according to one embodiment of the present disclosure.

FIG. 7 is a flow diagram illustrating a method 150 for synchronizing the shared workspace 52 on the AS 50 and local rooms 14 on the client device s 10 according to one embodiment of the present disclosure. Method 150 begins with the client device 10 generating a delta (box 152). As stated above, the delta may be generated whenever a user makes a change to its local room 14. The synchronization manager 16 applies the delta to the local dictionary 70, and adds the inverse of the delta to an undo list (box 154). The undo list is a list of identifiers that uniquely identify each delta. Using this list, the client device 10 can track which deltas have, or have not been, successfully applied to the shared workspace 52 by synchronization server 14.

Once the undo list has been updated, the synchronization manager at client device 10 sends the delta to synchronization server 54 at AS 50 (box 156). Upon receipt, the synchronization server 54 applies the delta to the master dictionary 100, forwards the delta to the other client devices 20, and returns a confirmation message to the client device 10 indicating that the delta was successfully applied (box 158). Upon receipt of this confirmation message at client device 10, the client device 10 will delete the delta from the undo list (box 160).

In some situations, it could be that client device 10 does not receive a confirmation message from the synchronization server 54. For example, the synchronization server 54 may not have been able to apply the update to the master dictionary 100, or the message informing the synchronization server 54 about the delta may have been dropped. Therefore, to address such situations, the client device 10 may be configured to re-send the delta to the synchronization server 54 for a predetermined number attempts (e.g., 3 times). Particularly, the client device 10 initiates an internal timer each time the client device 10 sends the delta to the synchronization server 54. If the timer expires before the client device 10 receives a confirmation message, the client device 10 will resend the delta to the synchronization server 54. If, after a predetermined number of attempts, the client device 10 still does not receive a confirmation message, the client device 10 will timeout and may perform some other action, such as notify the user of client device 10, for example.

In some instances, conflicts may occur whenever multiple client devices send deltas to synchronization server 54 in parallel. For example, if client device 10A sends a delta—e.g., delta $\Delta_{m'}$—that is supposed to be applied before another delta—e.g., delta $\Delta_m$—that was sent by client device 10B, then client device 10A will need to resolve this conflict. Therefore, to resolve the conflict, the present disclosure assigns a globally unique GUID to every delta that gets generated. Upon receiving the confirmation message from the synchronization server 54, the client device 10A will attempt to match the GUID returned in the confirmation message to the GUID in the undo list. If the delta GUID received in the conformation does not match the GUID of the first delta in the undo list at the client device 10A, then a conflict exists.

All confirmations returned from the AS 50 are returned in the order in which they are received at the synchronization server 54. Therefore, to resolve a conflict between two deltas, the client devices 10 first applies undo delta's $U_n$ through $U_m$, applies the received delta $\Delta m'$ to the local dictionary 70, and then reapplies deltas $\Delta_m$ through $\Delta_n$ that were locally generated.

Figure 8:
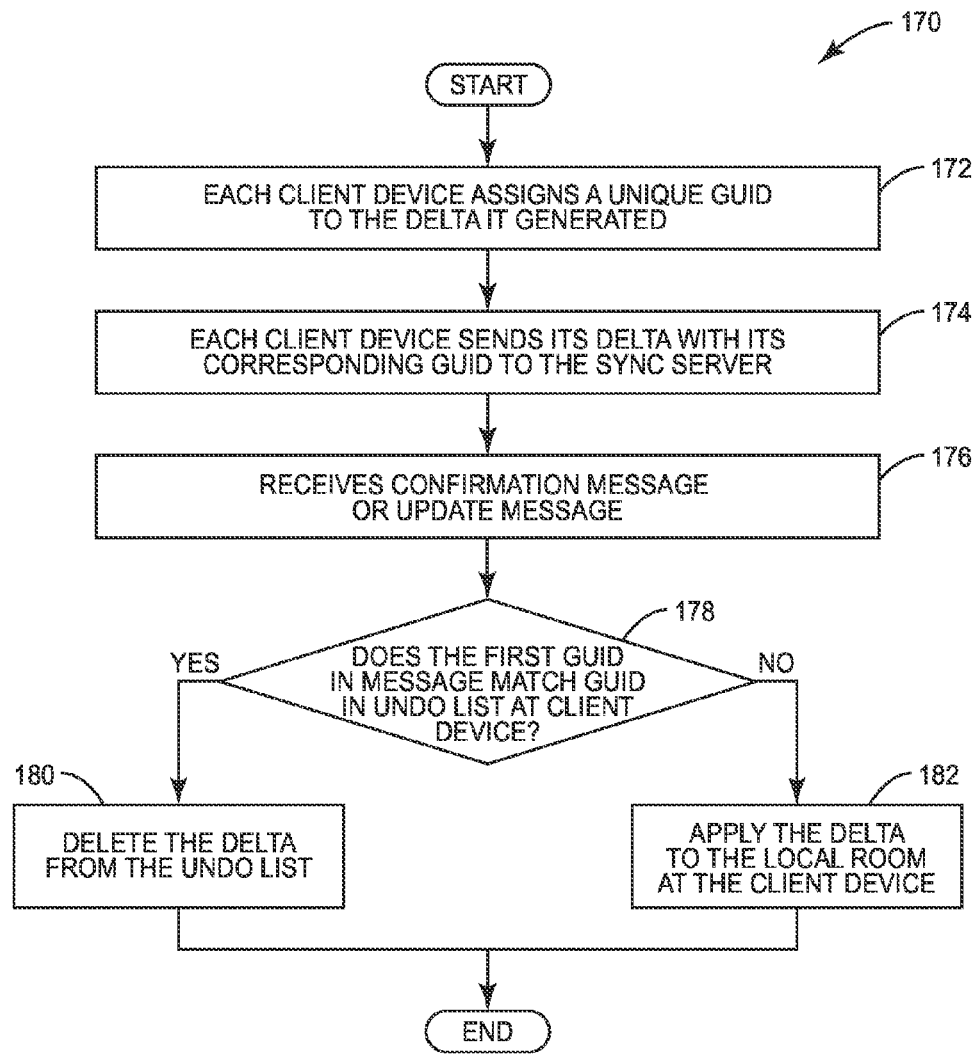
FIG. 8 is a flow diagram illustrating a method for maintaining synchronization of the UIs at the client devices as those users make changes to their respective UIs according to one embodiment of the present disclosure.

FIG. 8 is another flow diagram illustrating a method 170 for resolving conflicts according to one embodiment of the present disclosure. Method 170 is performed at a client device, such as client device 10. Method 170 begins with client device 10 assigning a globally unique GUID to a delta that it had just generated (box 172). The client device 10 then sends the delta, along with its respective GUID, to the synchronization server 54 (box 174). The client then receives, in turn, the confirmation from synchronization server 54 that it received and applied the delta (box 176). All delta received by the synchronization server 54 are forwarded to other client devices 10 in the same order in which they were received at the synchronization server 54.

When a client device 10 receives a confirmation message or update message from the synchronization service 54, it compares the GUID of the received message to the first GUID in the undo list (box 178). If the GUIDs match, then the client device 10 had also sent the update and it can delete the GUID from its undo list (box 180). Otherwise, if the GUIDs do not match, client device 10 did not generate the update. Rather, the update was generated by another client device. In these cases, the synchronization manager 16 at the client device 10 will not have an entry on the undo list to remove. Instead, the synchronization manager 16 at the client device 10 will apply the received delta to its own local dictionary 70 (box 182).

Figure 9:
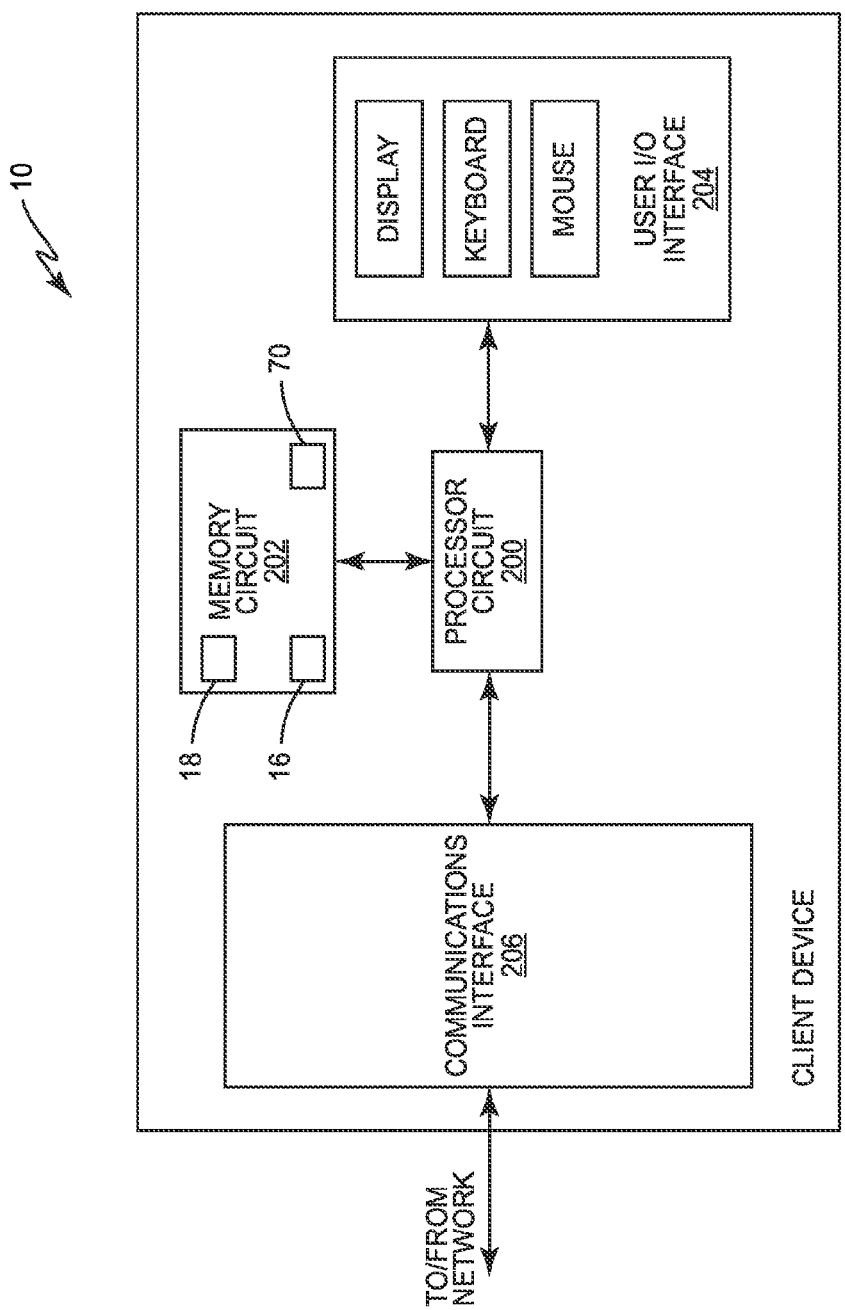
FIG. 9 is a functional block diagram of a client device configured according to one embodiment of the present disclosure.

FIG. 9 is a functional block diagram of a client device 10 configured according to one embodiment of the present disclosure. Client device 10 comprises a processing circuit 200, a memory circuit 202, a user input/output (I/O) interface 204, and a communications interface 206. As is known in the art, client device 10 may include other components that are not specifically shown in the figures.

Processing circuit 200, which may comprise one or more microprocessors, microcontrollers, hardware circuits, or a combination thereof, generally controls control the operation of the client device 10. As seen in FIG. 9, processing circuit 200 communicatively interconnects the memory circuit 202, the user I/O interface 204, and the communications interface 206. Configured according to one or more embodiments of the present disclosure, the processing circuit 200 manages the operation of the connection manager 18 and the synchronization manager 16, and updates the UI of the client device 10, and the state of the local room 14 (by updating the state of the local dictionary 70), with items based on data received in messages from synchronization server 54. In addition, responsive to the user updating the state of the local workspace 14 by adding and/or removing items, processing circuit 200 updates the state of the local dictionary 70, and generates update messages to send to the synchronization server 54 so that, upon receipt of the update messages, synchronization server 54 can update the shared workspace 52 (by updating the master dictionary 100) and propagate the updates to the other client devices 10, as previously described.

Memory circuit 202 stores the program code and data needed by the processing circuit 200 to operate as herein described. Memory circuit 202 may comprise any combination of volatile and non-volatile memory devices, and may include discrete memory devices as well as internal memory. Program code executed by the processing circuit 200, such as the code for the connection manager 18 and synchronization manager 16, for example, is typically stored in a non-volatile memory such as a read-only memory (ROM) or flash memory, while temporary data generated during operation of the hand-held device 10 may be stored in a volatile memory, such as a random access memory (RAM).

The User I/O interface 204 comprises one or more devices that allow a user to interact with, and control the operation of, client device 10. By way of example, the User I/O interface 204 may comprise well-known components including, but not limited to, a display device for displaying a UI, and a keyboard and a mouse for allowing the user to add and/or remove assets from the local room 14 interactively.

The communications interface 206 comprises an interface for communicating with one or more other remotely located devices, such as AS 50, over a communications network. The communications interface circuit 206 may effect such communications using one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. The communication interface 206 implements receiver and transmitter functionality appropriate to communication network links (e.g., optical, electrical, and the like), and the transmitter and receiver functions may share circuit components and/or software, or alternatively may be implemented separately.

In embodiments where the client device 10 is a wireless communications device (e.g., a smartphone), the communications interface 206 comprises a radio transceiver configured to communicate with remote parties and devices via a wireless communications network, such as a mobile communications network. For example, the communications interface 206 may be configured to communicate across an air interface with at least one node of a radio access network, such as a base station (BS), utilizing any well-known protocol or that may be developed. Some exemplary protocols include, but are not limited to, IEEE 802.xx, CDMA, WCDMA, GSM, EDGE, LTE, UTRAN, E-UTRAN, WiMax, and the like.

Figure 10:
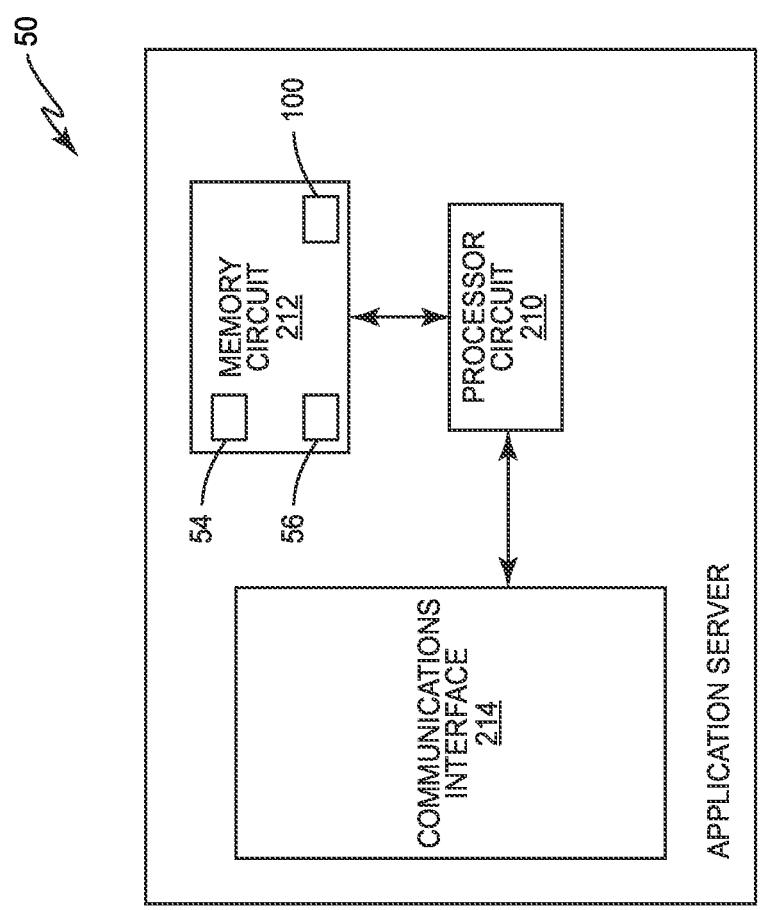
FIG. 10 is a functional block diagram of an application server (AS) configured according to one embodiment of the present disclosure.

FIG. 10 is a functional block diagram of a server device, such as AS 50, configured according to one embodiment of the present disclosure. As seen in FIG. 10, AS 50 comprises a processing circuit 210, a memory circuit 212, and a communications interface 214. Those of ordinary skill in the art should realize, however, that AS 50 may comprise other components not expressly seen herein as needed or desired.

Processing circuit 210 may also comprise one or more microprocessors, microcontrollers, hardware circuits, or a combination thereof, and is configured to generally control the operation of AS 50. According to the embodiments of the present disclosure, processing circuit 210 executes connection server 56, as well as the synchronization server 54, to update the shared workspace 52 (by updating the master dictionary 100). As previously described, the updates are based on data received from a client device, such as client device 10, and then propagated to the other client devices so that those devices may update their respective local copies of the shared workspace 52.

Memory circuit 212 stores the program code and data needed by the processing circuit 210 to operate as herein described. Memory circuit 212 may comprise any combination of volatile and non-volatile memory devices, and may include discrete memory devices as well as internal memory. Program code executed by the processing circuit 200, such as the code for the connection server 56 and synchronization server 54, are typically stored in a non-volatile memory such as a read-only memory (ROM) or flash memory, while temporary data generated during operation of AS 50 may be stored in a volatile memory, such as a random access memory (RAM).

The communications interface 214 also comprises an interface for communicating with one or more other remotely located devices, such as client devices 10 over a communications network, such as network 42. The communications interface circuit 214 may utilize one or more communication protocols that are known in the art or that may be developed, such as IMS/SIP, Diameter, HTTP, RTP, RTCP, HTTPs, SRTP, CAP, DCCP, Ethernet, TCP/IP, SONET, ATM, or the like, and is configured to facilitate communications between the AS 50 and the client devices 10, 60, to synchronize the shared workspace 52 with each of the local rooms 14 at each of the client devices 10.

The present disclosure may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A computer-implemented method for synchronizing collaborative user interfaces, the method comprising:
   at a synchronization server communicatively connected to a plurality of client devices:
      establishing a communication session for each of the plurality of client devices, wherein each client device maintains a local dictionary representing a state of a shared workspace at the client device;
      maintaining a master dictionary representing a state of the shared workspace at the synchronization server, and a master state count having a value indicating whether the master dictionary is synchronized with the local dictionary;
      receiving, from an originating client device, an update message indicating a change made by the originating client device to its local dictionary, wherein the update message comprises an ordered set of operations to be applied by the synchronization server to synchronize the master dictionary with the local dictionary of the originating client device;
      constructing an undo registry comprising determining, for each update:
         an ordered set of inverse operations associated with each update that, when applied by the synchronization server, undoes updates made to the master dictionary; and
         a corresponding globally unique identifier (GUID) assigned by the originating client device to each update;
      synchronizing the master dictionary with the local dictionary of the originating client device based on data received in the update message by:
         updating the master dictionary by applying the set of ordered operations to the master dictionary; and
         incrementing the master state count value to match a local state count value maintained by the originating client device;
      responsive to synchronizing the master dictionary with the local dictionary of the originating client device:
         sending a confirmation message to the originating client device indicating that the change has been made to the master dictionary; and
         propagating the change to a peer device of the originating client device; and
      responsive to receiving an acknowledgment message from the peer device indicating that the change has been made at the peer device:
         determining the GUID associated with the change from the acknowledgement message; and
         removing the ordered set of inverse operations corresponding to the GUID from the undo registry.

2. The method of claim 1 further comprising determining whether a first client device is connecting to the synchronization server for a first time, or is reconnecting to the synchronization server.

3. The method of claim 2 wherein, responsive to determining that the first client device is connecting to the synchronization server for the first time:
   sending a copy of the master dictionary representing a current state of the shared workspace to the first client device; and
   setting the local state count value of the first client device to the master state count value.

4. The method of claim 2 wherein, responsive to determining that the first client device is reconnecting to the synchronization server:
   determining whether the master dictionary comprises any unapplied changes that have yet to be applied to the local dictionary of the first client device;
   if there are any unapplied changes in the master dictionary, sending the unapplied changes to the first client device to synchronize the local dictionary of the first client device to the master dictionary;
   if there are no unapplied changes in the master dictionary, sending a copy of the master dictionary representing a current state of the shared workspace to the first client device; and
   setting the local state count value at the first client device to the master state count value.

5. A network-based synchronization server comprising:
a memory circuit;
a communications interface configured to communicate with a plurality of client devices, wherein each client device maintains a local dictionary representing a state of a shared workspace at the client device; and
a processing circuit configured to:
  maintain, in the memory circuit:
    a master dictionary comprising information representing a state of the shared workspace; and
    a master state count having a value indicating whether the master dictionary is synchronized with the local dictionaries of the plurality of client devices;
  receive, from an originating client device, an update message indicating a change made by the originating client device to its local dictionary, wherein the update message comprises an ordered set of operations to be applied by the processing circuit to synchronize the master dictionary with the local dictionary of the originating client device;
  construct an undo registry comprising determining, for each update:
    an ordered set of inverse operations associated with each update that, when applied by the synchronization server, undoes updates made to the master dictionary; and
    a corresponding globally unique identifier (GUID) assigned by the originating client device to each update;
  synchronize the master dictionary with the local dictionary of the originating client device based on data received in the update message by:
    updating the master dictionary by applying the set of ordered operations to the master dictionary; and
    incrementing the master state count value to match a local state count value maintained at the originating client device;
  responsive to synchronizing the master dictionary to the local dictionary of the originating client device:
    send a confirmation message to the originating client device, wherein the confirmation message indicates that the change has been made to the master dictionary; and
    propagate the change in an update message to a peer device of the originating device; and
  responsive to receiving an acknowledgment message from the peer device indicating that the change has been made at the peer device:
    determine the GUID associated with the change from the acknowledgement message; and
    remove the ordered set of inverse operations corresponding to the GUID from the undo registry.

6. The network-based device synchronization server of claim 5 wherein the processing circuit is further configured to determine whether a first client device is connecting to the network-based synchronization server for a first time, or is reconnecting to the network-based device synchronization server.

7. The network-based synchronization server of claim 6 wherein, responsive to determining that the first client device is connecting to the network-based synchronization server for the first time, the processing circuit is configured to:
  send a copy of the master dictionary representing a current state of the shared workspace to the first client device; and
  set the local state count value of the first client device to the master state count value.

8. The network-based synchronization server of claim 6 wherein, responsive to determining that the first client device is reconnecting to the network-based synchronization server, the processing circuit is configured to:
  determine whether the master dictionary comprises any unapplied changes that have yet to be applied to the local dictionary of the first client device;
  if there are any unapplied changes in the master dictionary, send the unapplied changes to the first client device to synchronize the local dictionary of the first client device to the master dictionary;
  if there are no unapplied changes in the master dictionary, send a copy of the master dictionary representing a current state of the shared workspace to the first client device; and
  set the local state count value of the first client device to the master state count value.

9. A computer-implemented method for synchronizing collaborative user interfaces, the method comprising:
  at a client device:
    applying a first update to a local dictionary, wherein the local dictionary comprises information representing a state of a shared workspace and is synchronized with a master dictionary at a synchronization server;
    maintaining a local state count value indicating whether the local dictionary is synchronized with the master dictionary;
    incrementing the local state count value responsive to applying the first update to the local dictionary;
    constructing an undo registry at the client device, wherein constructing the undo registry comprises:
      determining, for each update, an ordered set of inverse operations associated with each update that, when applied by the client device, undoes corresponding updates at the local dictionary; and
      assigning a globally unique identifier (GUID) to each update;
    sending an update message including the first update to the synchronization server;
    waiting for a confirmation message from the synchronization server;
    undoing the first update by applying the ordered set of inverse operations corresponding to the first update if:
      no confirmation message is received from the network-based server after a predetermined period of time; or
      a second update is received from the synchronization server before the confirmation message for the first update is received;
    removing the ordered set of inverse operations corresponding to the first update from the undo registry responsive to receiving a confirmation message from the synchronization server indicating that the first update was successfully applied to the master dictionary;
    receiving a plurality of update messages from the synchronization server, wherein the update messages represent corresponding updates made to the shared workspace by one or more peer client devices and include corresponding GUIDs; and
    determining whether a conflict exists between the updates based on whether the GUIDs received with the update messages match any of the GUIDs in the undo registry;

removing a given update from the undo registry responsive to determining that the GUID received with the update message corresponding to the given update matches at least one GUID in the undo registry; and applying the given update to the local dictionary responsive to determining that the GUID received with the update message corresponding to the given update does not match any of the GUIDs in the undo registry.

10. The method of claim 9 further comprising:

generating a globally unique identifier (GUID) for the first update; and wherein the update message sent to the synchronization server further includes the GUID assigned to the first update.

11. The method of claim 10 further comprising:

receiving the confirmation message from the synchronization server, wherein the confirmation message includes the GUID;

comparing the GUID received with the confirmation message from the synchronization server to one or more GUIDs in the undo registry.

12. A client device comprising:

a memory circuit;

a communications interface configured to communicate with a synchronization server; and a processing circuit configured to:
  maintain, in the memory circuit:
    a local dictionary comprising information representing a state of a shared workspace, wherein the local dictionary is synchronized with a master dictionary at the network-based server; and
    a local state count value indicating whether the local dictionary is synchronized with the master dictionary;
  apply a first update to the local dictionary;
  increment the local state count value responsive to applying the first update to the local dictionary;
  construct an undo registry at the client device by:
    determining, for each update, an ordered set of inverse operations associated with each update that, when applied by the client device, undoes corresponding updates at the local dictionary; and
    assigning a globally unique identifier (GUID) to each ordered set of inverse operations;
  send an update message including the first update to the network-based server;
  wait to receive a confirmation message from the synchronization server;
  undo the first update by applying the ordered set of inverse operations corresponding to the first update if:
    no confirmation message is received from the synchronization server after a predetermined period of time; or
    a second update is received from the synchronization server before the confirmation message for the first update is received;
  remove the first update the ordered set of inverse operations corresponding to from the undo registry responsive to receiving a confirmation message from the synchronization server indicating that the first update was successfully applied to the master dictionary;
  receive a plurality of update messages from the synchronization server, wherein the update messages represent corresponding updates made to the shared workspace by one or more peer client devices and include corresponding GUIDs; and
  determine whether a conflict exists between the updates based on whether the GUIDs received with the update messages match any of the GUIDs in the undo registry;
  remove a given update from the undo registry responsive to determining that the GUID received with the update message corresponding to the given update matches at least one GUID in the undo registry; and
  apply the given update to the local dictionary responsive to determining that the GUID received with the update message corresponding to the given update does not match any of the GUIDs in the undo registry.

13. The client device of claim 12 wherein the processing circuit is further configured to:

generate the globally unique identifier (GUID) for the first update;

wherein the update message sent to the synchronization server further includes the GUID assigned to the first update.

14. The client device of claim 13 wherein the processing circuit is further configured to:

receive the confirmation message from the network-based server, wherein the confirmation message includes the GUID;

compare the GUID received with the confirmation message from the synchronization server to one or more GUIDs in the undo registry.

* * * * *